United States Patent [19]

Bennett

[11] Patent Number: 5,742,602
[45] Date of Patent: Apr. 21, 1998

[54] ADAPTIVE REPEATER SYSTEM

[75] Inventor: Arthur T. Bennett, Coppell, Tex.

[73] Assignee: Compaq Computer Corporation, Houston, Tex.

[21] Appl. No.: 501,288

[22] Filed: Jul. 12, 1995

[51] Int. Cl.⁶ .............................. H04L 12/46; H04Q 1/00
[52] U.S. Cl. ........................... 370/401; 370/465; 370/501
[58] Field of Search ................................. 370/84, 85.13, 370/13.1, 97, 79, 94.3, 400, 401, 402, 403, 404, 405, 406, 407, 501, 502, 543, 465; 395/200.13; 375/211, 212

[56] References Cited

U.S. PATENT DOCUMENTS

| | | | |
|---|---|---|---|
| Re. 33,426 | 11/1990 | Sugimoto et al. | 370/85.14 |
| 4,201,892 | 5/1980 | Schmidt | 370/104 |
| 4,500,990 | 2/1985 | Akashi | 370/85 |
| 4,536,872 | 8/1985 | Lahti | 370/82 |
| 4,597,078 | 6/1986 | Kempf | 370/94 |
| 4,627,052 | 12/1986 | Hoare et al. | 370/88 |
| 4,630,254 | 12/1986 | Tseng | 370/60 |
| 4,700,344 | 10/1987 | Kaino et al. | 370/94 |
| 4,716,408 | 12/1987 | O'Connor et al. | 370/85 |
| 4,737,953 | 4/1988 | Koch et al. | 370/94 |
| 4,825,435 | 4/1989 | Amundsen et al. | 370/97 |
| 4,882,726 | 11/1989 | Lang et al. | 370/24 |
| 4,901,312 | 2/1990 | Hui et al. | 370/85.12 |
| 4,922,503 | 5/1990 | Leone | 370/85.13 |
| 4,953,180 | 8/1990 | Fieschi et al. | 370/84 |
| 4,982,400 | 1/1991 | Ebersole | 370/85.15 |
| 5,060,228 | 10/1991 | Tsutsui et al. | 370/85.13 |
| 5,088,032 | 2/1992 | Bosack | 395/200 |
| 5,111,453 | 5/1992 | Morrow | 370/85.13 |
| 5,134,612 | 7/1992 | Yoshimura | 370/84 |
| 5,179,554 | 1/1993 | Lomicka et al. | 370/85.13 |
| 5,214,646 | 5/1993 | Yacoby | 370/85.14 |
| 5,251,213 | 10/1993 | Videlock et al. | 370/85.12 |
| 5,299,195 | 3/1994 | Shah | 370/85.6 |
| 5,301,303 | 4/1994 | Abraham et al. | 395/500 |
| 5,321,542 | 6/1994 | Freitas et al. | 359/172 |
| 5,329,618 | 7/1994 | Moati et al. | 395/200 |
| 5,343,471 | 8/1994 | Cassagnol | 370/85.13 |
| 5,379,289 | 1/1995 | DeSouza et al. | 370/85.13 |
| 5,384,766 | 1/1995 | Yamato et al. | 370/84 |
| 5,400,330 | 3/1995 | Le Van Suu | 370/84 |
| 5,434,859 | 7/1995 | Levardon | 370/84 |
| 5,434,860 | 7/1995 | Riddle | 370/84 |
| 5,442,622 | 8/1995 | Hokari | 370/16 |
| 5,461,618 | 10/1995 | Chen et al. | 370/84 |
| 5,513,172 | 4/1996 | Shikama et al. | 370/13 |

OTHER PUBLICATIONS

Data Communications; vol. 24, No. 3, Mar. 1995; New York, US; pp. 129–132, 134; Peter Rauch, Scott Lawrence: "100VG–AnyLAN: The Other Fast Ethernet": *p. 130, left-hand column, line 11 through middle column, line 19* *p. 131, left-hand column, line 8 through line 37*.

Electronic Design; vol. 43, No. 6, Mar. 20, 1995; Cleveland, OH, US.; pp. 155, 156, 158, 160; Lee Goldberg: "100Base–T4 Transceiver Simplifies Adapter, Repeater, and Switch Designs": *p. 155, line 1 through line 34* *p. 156, right-hand column, line 3 through line 17* *p. 160, middle column, line 50 through right-hand column line 6*.

"Penril Series 2000 Overview" Brochure, *Penril Datacomm Networks*, May, 1992, 4 pages.

"Penril Series 2500 Overview" Brochure, *Penril Datacomm Networks*, May, 1992, 4 pages.

"Penril Module 2530 10BaseT Concentration+Bridging" Brochure, *Penril Datacomm Networks*, May, 1992, 2 pages.

(List continued on next page.)

*Primary Examiner*—Hassan Kizou
*Assistant Examiner*—Kwang Bin Yao
*Attorney, Agent, or Firm*—Jenkens & Gilchrist

[57] ABSTRACT

A network (10) includes an adaptive repeater (12) that can service data devices at different data rates. Data devices (18, 20, 22) couple to ports (34) of the adaptive repeater (12), and operate at a first rate in a first domain (14). Data devices (26, 28, 30) also couple to ports (34) of adaptive repeater (12) and operate at a second rate in a second domain (16). Repeaters (24, 32) and bridges (40, 42) may also couple to the adaptive repeater (12).

25 Claims, 3 Drawing Sheets

OTHER PUBLICATIONS

"MultiGate Product Guide 1992" Draft, *Network Resources Corporation*, 1992, pp. 1–18.

"Retix® 4760 High–Performance Local Bridge/Router" Brochure, *Retix®*, 1992, 4 pages.

"Retix® 4660 High Performance Local Bridge" Brochure, *Retix®*, 1993, 4 pages.

"HUB 2 Input/Output Bus Block Diagram," *Picazo*, Jan. 26, 1993, 1 page.

"Product Specifications—AsantéHub 1012" Brochure, *Asanté Technologies, Inc.*, May, 1993, 6 pages.

"AsantéHub 2072" Brochure, *Asanté Technologies, Inc.*, May, 1993, 8 pages.

"AsantéView" Brochure, *Asanté Technologies, Inc.*, May, 1993, 4 pages.

"David ExpressNet® Workgroup Hubs" Brochure, *David Systems Incorporated*, May, 1993, 2 pages.

William B. Urinoski, "NetMetrix," *The X Journal*, May–Jun., 1993, 2 pages.

"HP NetMetrix" Advertisement, *Hewlett® Packard*, Source Unknown, Date Unknown, 2 pages.

"HP ProbeView/SNMP for Open View and LanProbe II segment monitors" Brochure, *Hewlett® Packard*, 1993, pp. 1–8.

"Networking Products" Brochure, *David Systems Incorporated*, Jul., 1993, 4 pages.

"Channel One Open Networking Enterprise Newsletter," *Retix®*, Fall, 1993, pp. 1–12.

"MultiGate® Hub 2" Brochure, *Network Resources Corporation*, Dec., 1993, 2 pages.

"MultiGate® Hub 1w" Brochure, *Network Resources Corporation*, Dec., 1993, 2 pages.

"NRC Fault Tolerant LAN Architecture" Brochure, *Network Resources Corporation*, Date Unknown, 4 pages.

"MultiGate Hub 1+" Brochure, *Network Resources Corporation*, Date Unknown, 1 page.

"MultiGate Hub 2—WAN Version" Brochure, *Network Resources Corporation*, Date Unknown, 1 page.

"The AsantéBridge 1012 Hardware Module Features" Brochure, *Asanté*, Date Unknown, 2 pages.

"IEEE 802.3/Ethernet Twisted Pair Products 10Base–T Standard Compatible" Brochure, *Cabletron Systems Inc.*, Date Unknown, pp. 1–12.

"Cisco Router Module" Brochure, *Cabletron Systems Inc.*, Date Unknown, 4 pages.

"82300 MainStreet® Ethernet Little Bridge" Brochure, *Newbridge Networks Inc.*, Date Unknown, 2 pages.

Letter from James P. McNaul, President and CEO of Fastlan Solutions to John F. McHale, President and CEO of NetWorth, Inc. with attached "Fastbridge™ 1200 Two–Port 10/100 Mbps Ethernet Bridge" Brochure, Jan. 31, 1995, 4 pages.

ANSI/IEEE Std 802.3 Draft Supplement—MAC Parameters, Medium Attachment Units, Repeater for 100 Mbps Operation (version 3.0), *IEEE Standards Department*, 1994, 212 pages.

"NetWorth™ 100 Base–T Cabling and Configuration" Brochure, 1995, 4 pages.

"Building Bandwidth: A White Paper on Designing Segmented Ethernet Networks," *Networth™*, Date Unknown, pp. 1–12.

"PowerPipes Ethernet/FDDI Switching Hub Client/Server Switching—NetWorth Switching White Paper," *NetWorth™*, 1993, pp. 1–8.

"NetWorth's Network Management Strategy," *NetWorth™*, Date Unknown, pp. 1–15.

"Fast Ethernet Strategy—Revision 1.0" Brochure, *NetWorth™*, 1995, 4 pages.

"Micro100™ Fast Ethernet Hub—Product Information Sheet Rev. 2.0" Brochure, *NetWorth™*, Date Unknown, 2 pages.

Gary Gunnerson, "Networking Switching Hubs—Switching to the Fast Track," *PC Magazine*, Oct. 11, 1994, 6 pages.

Scott Bradner, "Network for Client/Server Computing—The Bradner Bridge Report," *CMP Publications, Inc.*, Oct. 1994, 4 pages.

"NetWorth's Legacy of NetWare Optimization," *NetWorth™*, Date Unknown, pp. 1–14.

ADAPTIVE REPEATER SYSTEM

TECHNICAL FIELD OF THE INVENTION

This invention relates to the field of networking data devices, and more particularly to an adaptive repeater system.

BACKGROUND OF THE INVENTION

Ethernet is a common communications standard used in local area networks (LANs) to share information among computers, printers, modems, and other data devices. A traditional Ethernet network operates at transmission rates of ten megabits per second (Mbps), but there is currently a move in the networking industry towards higher capacity 100-Mbps networks. This transition towards higher transmission rates often results in hybrid systems that service both 10-Mbps and 100-Mbps data devices.

A repeater in a network receives data from a data device and re-transmits the data to the remaining data devices attached to the repeater. For example, a 10-Mbps repeater with six ports may receive a data message on one of its ports and repeat or re-transmit the message to the remaining five ports. Without bridging devices, each data device coupled to the repeater normally operates at 10-Mbps. To service 100-Mbps data devices, the network could add an additional 100-Mbps repeater.

As networks evolve with a mix of data devices operating at different data rates, repeater couplings and hardware must also be modified.

SUMMARY OF THE INVENTION

Therefore, a need has arisen for a repeater that can service data devices at different data rates.

In one embodiment of the present invention, a system for communicating data includes a plurality of data devices, each data device operable to communicate data at one of a first rate and a second rate. A repeater coupled to the data devices includes a first repeater module operable to receive first data from a first data device operating at the first rate and to communicate the first data to the remaining data devices operating at the first rate. The repeater also includes a second repeater module operable to receive second data from a second data device operating at the second rate and to communicate the second data to the remaining data devices operating at the second rate.

In another embodiment of the present invention, a method for exchanging data among a plurality of data devices coupled to a repeater includes: communicating data from a transmitting data device to the repeater at a data rate; communicating the data, in response to the data rate, to one of a first repeater module and a second repeater module residing in the repeater; and communicating the data from the selected one of the first repeater module and the second repeater module to other data devices coupled to the repeater and operating at the data rate of the transmitting data device.

Technical advantages of the present invention include providing a repeater that services data devices operating at different data rates. This is accomplished by providing a plurality of interface circuits coupled to the data devices that can transmit and receive data at different rates. In one embodiment, each of the interface circuits are coupled to two repeater modules operating at different data rates. This architecture provides the advantage of automatically determining the rate of a data device coupled to the repeater and servicing that data device with the repeater module operating at the same rate. The present invention eliminates the need to modify couplings at the repeater to maintain consistency in the data rates. This is a particular advantage when the transmission media coupling data devices to the repeater supports different data rates. Furthermore, the present invention allows modification of data rates at the data device without requiring modifications to repeater hardware or couplings. The repeater can include bridge ports on the repeater modules, as well as uplink ports for coupling to additional repeaters.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

Figure 1:
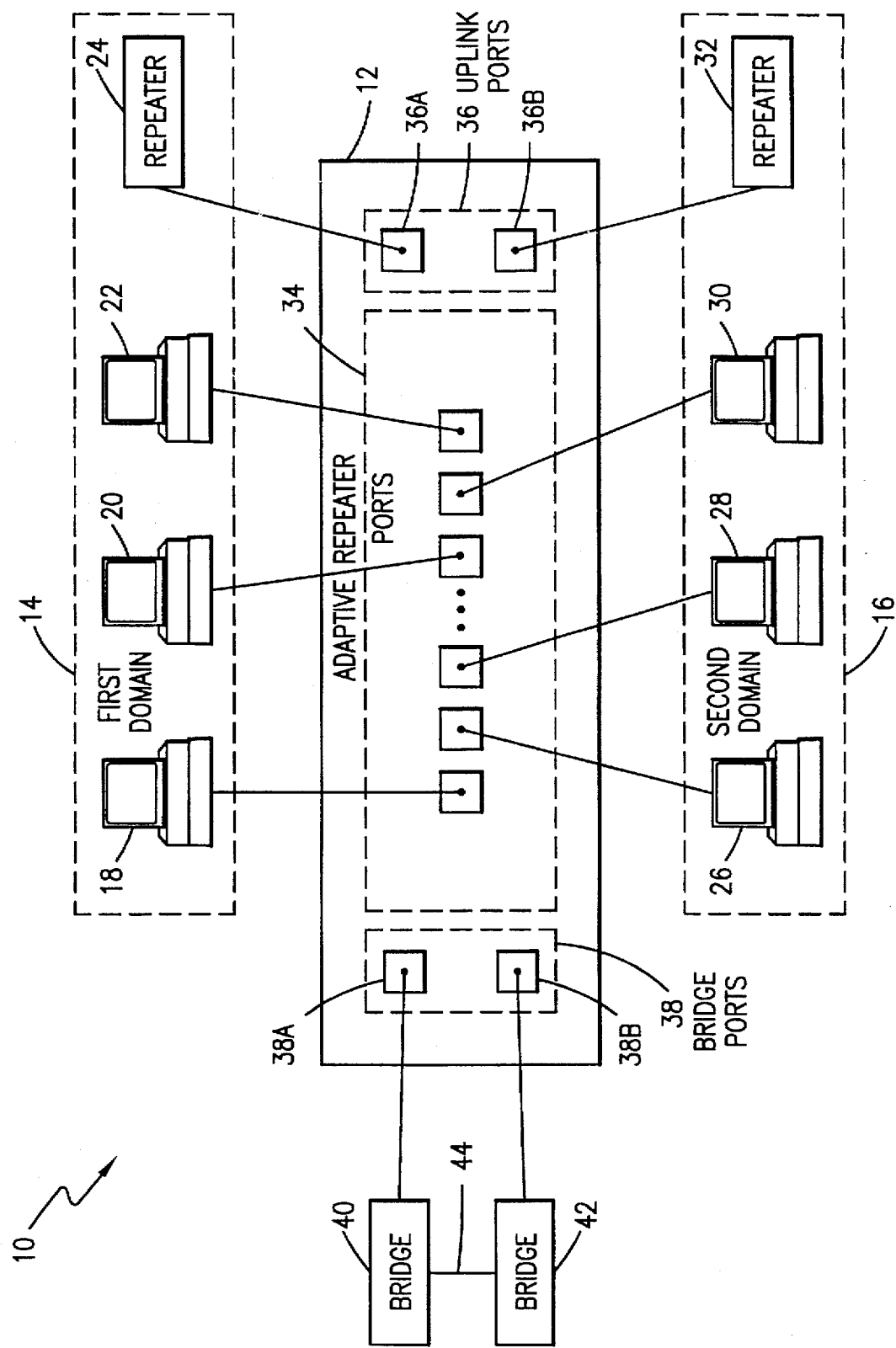
FIG. 1 illustrates a network of data devices.

FIG. 1 illustrates a network 10 for interconnecting a plurality of data devices. Network 10 includes an adaptive repeater 12 servicing data devices in a first domain 14 operating at a first rate and data devices in a second domain 16 operating at a second rate. Network 10 can operate as an Ethernet local area network (LAN) (specified in *IEEE* 802.3), a fast Ethernet LAN (specified in *IEEE* 802.3u), or as any other network for communicating data among data devices coupled to adaptive repeater 12.

First domain 14 includes data devices 18, 20, and 22. Second domain 16 includes data devices 26, 28, and 30. Data devices 18, 20, 22, 26, 28, and 30, represented collectively by exemplary data device 18, include any source or destination of data connected to network 10. Data device 18 is any type of data terminal equipment (DTE) that allows either input or output of data. For example, data device 18 can be a computer, work station, file server, modem, printer, or any other device that can receive or transmit data in network 10. Data devices 18, 20, and 22 transmit and receive data at a first rate, such as 10-Mbps using traditional Ethernet protocol. Data devices 26, 28, and 30 transmit and receive data at a second rate, such as 100-Mbps using fast Ethernet protocol. Data devices may be coupled to adaptive repeater 12 using unshielded twisted pair (UTP), shielded twisted pair (STP), fiber optic lines, wireless links, such as infrared or radio frequency links, or any other link that allows communication of data between data devices and adaptive repeater 12.

Repeaters 24 and 32 increase the number of data devices serviced in first domain 14 and second domain 16, respectively. Repeater 24 operates at a first rate and allows additional data devices to be added to domain 14. Repeater 32 operates at second rate and allows additional data devices to be added to second domain 16. Repeaters 24 and 32 may be coupled to adaptive repeater 12 using any of the technologies discussed above for coupling data devices, including a fiber optic inter-repeater link (FOIRL).

Data devices in first domain 14 and second domain 16 couple to ports 34 on adaptive repeater 12. Each port 34 operates at a first rate or a second rate in response to the data rate of the coupled data device. Ports 34 are frequency agile, that is, they automatically negotiate the rate of coupled data devices and select the appropriate frequency to communicate data. Therefore, a data device may modify its rate and adaptive repeater 12 can automatically place the data device in the proper repeater domain without modifying couplings at ports 34. For example, data device 18 may upgrade from 10-Mbps to 100-Mbps, and the associated port 34 would automatically detect the change in data rate and place data device 18 in second domain 16. In this manner, a network that includes data devices at a first rate and a second rate can be easily managed, upgraded, and re-configured without the need to modify couplings at ports 34.

Uplink ports 36 couple repeaters 24 and 32 to first domain 14 and second domain 16, respectively. Uplink ports 36 may be switchable to service only a single data rate or may be frequency agile like ports 34. In the configuration of FIG. 1, uplink port 36a operates at a first rate and couples to adaptive repeater 12 to increase the number of data devices in first domain 14. Furthermore, repeater 24 may include another uplink port to couple to another repeater for further increasing the number of data devices in first domain 14. In a similar fashion, uplink port 36b operates at a second rate and couples to repeater 32 for increasing the number of data devices in second domain 16. Likewise, repeater 32 may include another uplinkport to couple to an additional repeater for further increasing the number of data devices in second domain 16. Repeater-to-repeater couplings may be a daisy-chain connection or other appropriate coupling.

Bridge ports 38 couple devices in first domain 14 and devices in second domain 16 to bridge 40 and bridge 42, respectively. Bridge port 38a operates, at least in part, at a first rate and couples devices in first domain 14 to bridge 40. Bridge port 38b operates, at least in part, at a second rate and couples devices in second domain 16 to bridge 42. Bridges 40 and 42 are shown as separate components, but it should be understood that they may be combined into an integral bridge. Bridges 40 and 42 allow data to be communicated between first domain 14 and second domain 16, as represented by link 44.

In operation, adaptive repeater 12 of network 10 services data devices at two or more data rates. For example, data device 18 communicates data to adaptive repeater 12. Adaptive repeater 12 detects that data is being received at a first rate and re-transmits this data to other devices coupled to adaptive repeater 12 that are operating at the first rate. Therefore, adaptive repeater 12 re-transmits the data to data devices 20 and 22, and optionally to repeater 24 and bridge 40. Similarly, data generated at data device 26 at a second rate is re-transmitted by adaptive repeater 12 to data devices 28 and 30, and optionally to repeater 32 and bridge 42. Adaptive repeater 12 automatically detects the data rate at ports 34, and establishes first domain 14 and second domain 16 accordingly.

Data device 18 in first domain 14 can communicate data to data device 26 in second domain 16 using bridges 40 and 42. Data device 18 transmits data at a first rate to adaptive repeater 12. Adaptive repeater 12 re-transmits the data received from data device 18 to other devices coupled to adaptive repeater 12 operating at the first rate, including bridge 40. Bridge 40 operating, at least in part, at the first rate re-transmits the data to bridge 42 using link 44. In bridge 40 or bridge 42, the data at the first rate is converted into data at a second rate, and bridge 42 re-transmits this data to port 38b of adaptive repeater 12. The data, now at the second rate, is then re-transmitted to the devices coupled to adaptive repeater 12 operating at the second rate, including data device 26.

Figure 2:
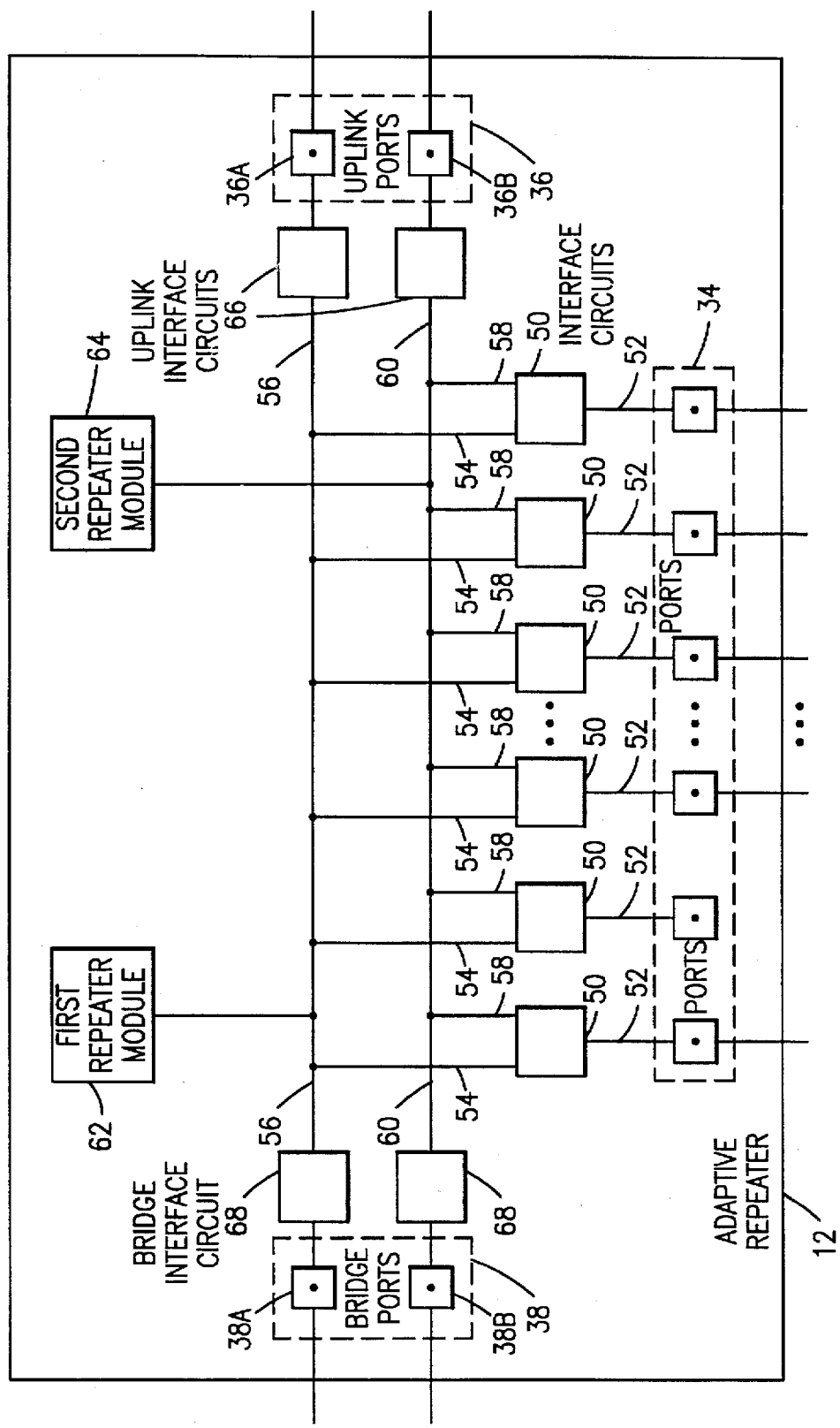
FIG. 2 is a schematic representation of a repeater.

FIG. 2 is a schematic representation of adaptive repeater 12 that includes ports 34, uplink ports 36, and bridge ports 38. Adaptive repeater 12 services data devices and repeaters in both first domain 14 and second domain 16. Adaptive repeater 12 also couples to bridges 40 and 42, which provide communication among first domain 14, second domain 16, and other repeater domains in network 10. Each port 34 couples a data device to an associated interface circuit 50.

Interface circuits 50 couple ports 34 to a first repeater module 62 and a second repeater module 64. Each interface circuit 50 includes a port link 52 coupled to port 34. A first bus link 54 couples interface circuit 50 to a first bus 56 operating at a first rate. Interface circuit 50 also includes a second bus link 58 coupled to a second bus 60 operating at a second rate. First repeater module 62 couples to first bus 56, and second repeater module 64 couples to second bus 60. First repeater module 62 and second repeater module 64 manage communications to and from interface circuits 50 over first bus 56 and second bus 60, respectively. Interface circuits 50 may be Ethernet transceivers or other physical layer components that can operate at both 10-Mbps and 100-Mbps, depending on the data rate of the associated data device. Examples of such commercially available devices include the RCC611 100BaseTX transceiver manufactured by Raytheon or the DP83840 10/100 Mbps physical layer device manufactured by National Semiconductor.

In operation, interface circuits 50 detect received data at a first rate or a second rate, and communicate data received at the first rate to first repeater module 62 and data received at the second rate to second repeater module 64. After detecting the rate of the received data, interface circuits 50 then select the appropriate data—either data at the first rate on bus 56 or data at the second rate on bus 60—for re-transmission to port 34 and the attached data device. Interface circuits 50 continue to receive and transmit data at the detected rate until a different rate is detected.

First uplinkmodule 62 receives data from a first interface circuit 50 operating at the first rate and re-transmits the data to the remaining interface circuits 50 operating at the first rate. Similarly, second uplink module 64 receives data from a second interface circuit 50 operating at the second rate and re-transmits the data to the remaining interface circuits operating at the second rate.

Uplink interface circuits 66 couple uplink ports 36a and 36b to first bus 56 and second bus 60, respectively. Bridge interface circuits 68 couple bridge ports 38a and 38b to first bus 56 and second bus 60, respectively. In the embodiment of FIG. 2, uplink ports 36 and bridge ports 38 are not switchable. Therefore, uplink port 36a and bridge port 38a communicate with first uplink module 62, and uplink port 36b and bridge port 38b communicate with second uplinkmodule 64.

First bus 56 and second bus 60 are shown as separate components of adaptive repeater 12. However, bus 56 and bus 60 may be integral to first repeater module 62, second repeater module 64, interface circuits 50, uplink interface circuits 66, bridge interface circuits 68, or a combination of these components. The present invention contemplates any structure or operation of first bus 56 and second bus 60 that allows first repeater module 62 and second repeater module 64, respectively, to interconnect with interface circuits 50, uplink interface circuits 66, and bridge interface circuits 68.

Figure 3:
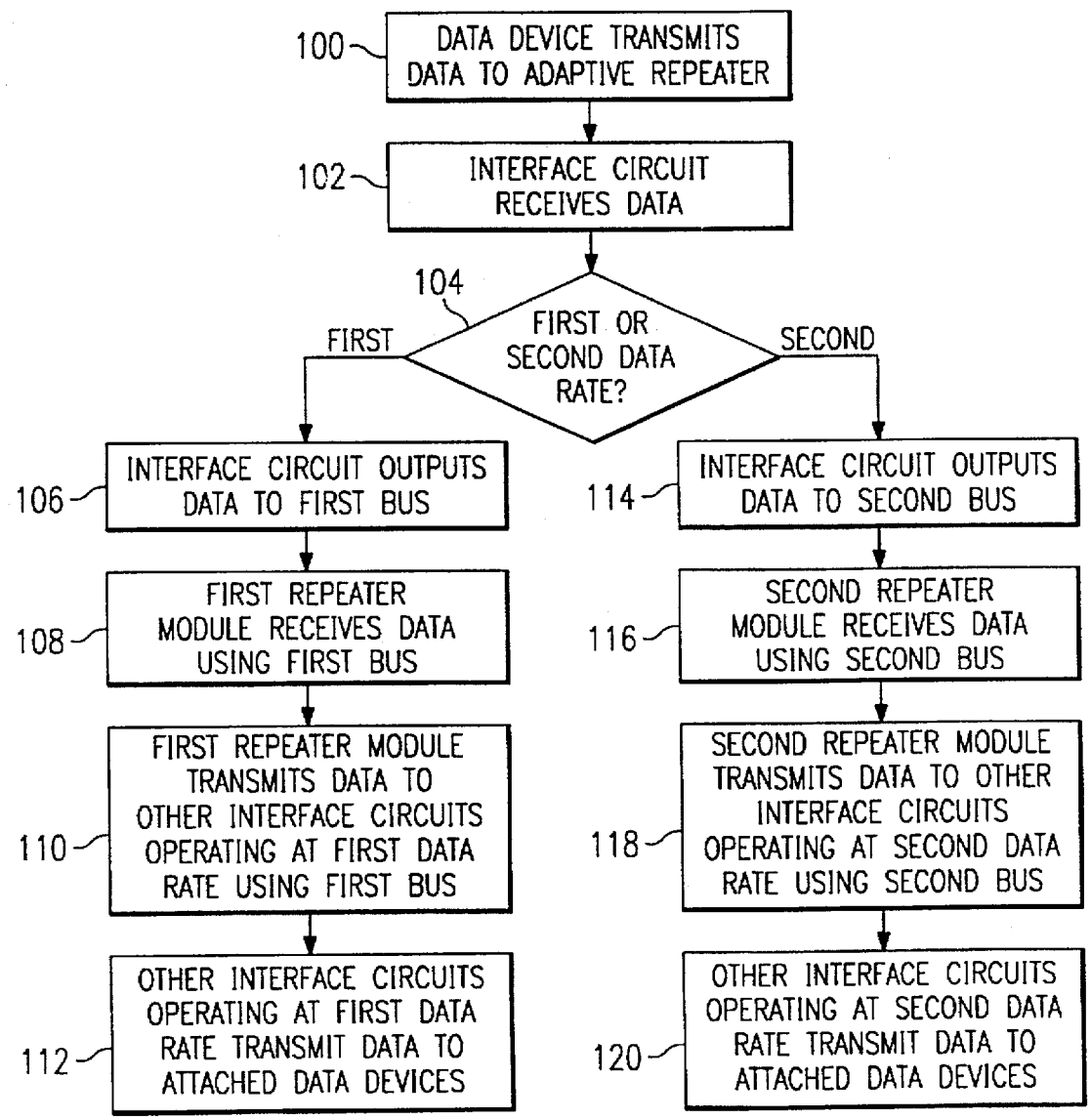
FIG. 3 is a flow chart of a method of communicating data using the repeater.

FIG. 3 illustrates a flow chart of a method for exchanging data among data devices coupled to adaptive repeater 12 in network 10. A data device 18 transmits data to adaptive repeater 12 (block 100). Interface circuit 50 coupled to port 34 associated with data device 18 receives data on port link 52 (block 102). Interface circuit 50 performs an auto-negotiation or other technique on the received data to determine the data rate (block 104). This may be performed using N-way auto-negotiation developed by International Business Machines, or any other technique to detect the transmission rate from data device 18.

If data is received at a first rate, then interface circuit 50 outputs data to first bus 56 using first bus link 54 (block 106). First repeater module 62 receives the data using first bus 56 (block 108). First repeater module 62 then transmits data using first bus 56 and first bus links 54 to other interface circuits 50 operating at the first rate (block 110). The other interface circuits 50 operating at the first rate transmit the data using port links 52 to associated data devices attached to ports 34 (block 112).

If interface circuit 50 determines that the data received at port link 52 is at a second rate (block 104), then interface circuit 50 outputs the data on second bus link 58 coupled to second bus 60 (block 114). Second repeater module 64 receives the data using second bus 60 (block 116). Second repeater module 64 then transmits the data using second bus 60 and second bus links 58 to other interface circuits 50 operating at the second rate (block 118). The other interface circuits 50 operating at the second rate transmit the data using port links 52 to associated data devices attached to ports 34 (block 120).

First repeater module 62 and second repeater module 64 may also communicate with associated uplink interface circuits 66. Uplink interface circuits 66 communicate with repeaters 24 and 32 to increase the number of data devices in first domain 14 and second domain 16, respectively. First repeater module 62 and second repeater module 64 may also communicate with bridge interface circuits 68. Bridge interface circuits 68 communicate with bridges 40 and 42 using bridge ports 38.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system for communicating data comprising:
a plurality of data devices of a first domain, each of said data devices of said first domain operable to communicate data at a first rate;
a plurality of data devices of a second domain, each of said data devices of said second domain operable to communicate data at a second rate;
a repeater coupled to each of said data devices of said first domain and said second domain;
said repeater including a first and a second repeater module, said first repeater module operable to receive data from a first data device of said plurality of data devices of said first domain operating at said first rate and further operable to communicate said data from said first data device of said plurality of data devices of said first domain to the remaining data devices of said plurality of data devices of said first domain operating at said first rate;
said second repeater module operable to receive data from a first data device of said plurality of data devices of said second domain operating at said second rate and further operable to communicate said data from said first data device of said plurality of data devices of said second domain to the remaining data devices of said plurality of data devices of said second domain operating at said second rate; and
said repeater further including a plurality of interface circuits coupled to each of said plurality of data device in said first domain and to each of said plurality of data device is said second domain, each of said plurality of interface circuits coupled to said first repeater module and said second repeater module, each of said plurality of interface circuits operable to communicate data received at said first rate to said first repeater module, each of said plurality of interface circuits further operable to communicate data received at said second rate to said second repeater module.

2. The system of claim 1, comprising at least one additional repeater coupled to said first repeater module.

3. The system of claim 1, comprising a bridge coupled to said first repeater module.

4. The system of claim 1, wherein said first rate is ten megabits per second and said second rate is one hundred megabits per second.

5. The system of claim 1, comprising:
a first bridge coupled to said first repeater module; and
a second bridge coupled to said first bridge and said second repeater module.

a second repeater module operable to receive second data from a second data device operating at the second rate and to communicate said second data to the remaining data devices operating at the second rate.

6. A repeater for exchanging data among a plurality of data devices, each of said plurality of data devices operating at a first or a second data rate, said repeater comprising:
a first repeater module operable to receive first data from a first data device operating at the first rate and to communicate said first data to the remaining data devices operating at the first rate;
a second repeater module operable to receive second data from a second data device operating at the second rate and to communicate said second data to the remaining data devices operating at the second rate; and
a plurality of interface circuits coupled to the data devices, each interface circuit coupled to said first repeater module and said second repeater module, each of said plurality of interface circuits operable to communicate data received at the first rate to said first repeater module, each of said plurality of interface circuits further operable to communicate data received at the second rate to said second repeater module.

7. The repeater of claim 6, comprising:
a first bus coupled to said first repeater module and to each of said plurality of interface circuits; and
a second bus coupled to said second repeater module and to each of said plurality of interface circuits.

8. The repeater of claim 6, comprising an uplink interface circuit coupled to said first repeater module.

9. The repeater of claim 6, comprising a bridge interface circuit coupled to said first repeater module.

10. The repeater of claim 6, wherein the first rate is ten megabits per second and the second rate is one hundred megabits per second.

11. A method for exchanging data among a plurality of data devices coupled to a repeater, comprising:
communicating data from a transmitting data device to the repeater at a data rate;
communicating the data, in response to the data rate, to one of a first repeater module and a second repeater module residing in the repeater;

receiving the data at an input of an interface circuit;

communicating, in response to the date rate, the data on a selected one of two outputs of the interface circuit; and communicating the data from the selected one of the first repeater module and the second repeater module to other data device coupled to the repeater and operating at the data rate of the transmitting data device.

12. The method of claim 11, wherein the step of communicating the data, in response to the data rate, comprises negotiating the data rate between the transmitting data device and the interface circuit.

13. The method of claim 11, wherein one of the two outputs is coupled to the first repeater module and the other of the two outputs is coupled to the second repeater module.

14. The method of claim 11, comprising communicating the data from the selected one of the first repeater module and the second repeater module to a bridge.

15. The method of claim 11, comprising communicating the data from the selected one of the first repeater module and the second repeater module to an additional repeater operating at the data rate of the transmitting data device.

16. A system for communicating data comprising:

a plurality of data devices of a first domain, each of said data devices of said first domain operable to communicate data at a first rate;

a plurality of data devices of a second domain, each of said data devices of said second domain operable to communicate data at a second rate;

a repeater coupled to each of said data devices of said first domain and said second domain;

said repeater including a first and a second repeater module, said first repeater module operable to receive data from a first data device of said plurality of data devices of said first domain operating at said first rate and further operable to communicate said data from said first data device of said plurality of data devices of said first domain to the remaining data devices of said plurality of data devices of said first domain operating at said first rate;

said second repeater module operable to receive data from a first data device of said plurality of data devices of said second domain operating at said second rate and further operable to communicate said data from said first data device of said plurality of data devices of said second domain to the remaining data devices of said plurality of data devices of said second domain operating at said second rate; and said repeater further comprising a plurality of interface circuits, each of said plurality of interface circuit coupled to an associated data device, each of said plurality of interface circuits coupled to the said first repeater module and said second repeater module, each of said plurality of interface circuits operable to receive data from the associated data device and to communicate data to one of said first repeater module and said second repeater module in response to the rate of the data.

17. The system of claim 16, comprising at least one additional repeater coupled to said first repeater module.

18. The system of claim 16, comprising a bridge coupled to said first repeater module.

19. The system of claim 16, wherein said first rate is ten megabits per second and said second rate is one hundred megabits per second.

20. The system of claim 16, comprising:

a first bridge coupled to said first repeater module; and a second bridge coupled to said first bridge and said second repeater module.

21. A repeater for exchanging data among a plurality of data devices, each of said plurality of data devices operating at a first or a second data rate, said repeater comprising:

a first repeater module operable to receive first data from a first data device operating at the first rate and to communicate said first data to the remaining data devices operating at the first rate;

a second repeater module operable to receive second data from a second data device operating at the second rate and to communicate said second data to the remaining data devices operating at the second rate; and a plurality of interface circuits, each of said plurality of interface circuits coupled to said first repeater module and said second repeater module, each of said plurality of interface circuits operable to receive data from an associated data device and to communicate data to a selected one of said first repeater module and said second repeater module in response to the rate of the data.

22. The repeater of claim 21, further comprising:

a first bus coupled to said first repeater module and to each of said plurality of interface circuits; and a second bus coupled to said second repeater module and to each of said plurality of interface circuits.

23. The repeater of claim 21, comprising an uplink interface circuit coupled to said first repeater module.

24. The repeater of claim 21, comprising a bridge interface circuit coupled to said first repeater module.

25. The repeater of claim 21, wherein the first rate is ten megabits per second and the second rate is one hundred megabits per second.

* * * * *